United States Patent [19]

Silvestrini et al.

[11] 4,187,939
[45] Feb. 12, 1980

[54] ARMATURE ASSEMBLY FOR ELECTROMAGNETIC COUPLING

[75] Inventors: Richard L. Silvestrini, Rockton, Ill.; Paul P. Newton, Beloit, Wis.

[73] Assignee: Warner Electric Brake & Clutch Company, South Beloit, Wis.

[21] Appl. No.: 860,154

[22] Filed: Dec. 14, 1977

[51] Int. Cl.² .................................. F16D 27/10
[52] U.S. Cl. ..................... 192/84 C; 192/30 V
[58] Field of Search ............... 192/30 V, 84 A, 84 C; 188/161, 162, 163, 164

[56] References Cited

U.S. PATENT DOCUMENTS

| | | | |
|---|---|---|---|
| 3,205,989 | 9/1965 | Mantey | 192/84 C |
| 3,565,223 | 2/1971 | Pierce | 192/30 V |
| 3,624,767 | 11/1971 | Kroeger | 192/84 A X |

Primary Examiner—Allan D. Herrmann
Attorney, Agent, or Firm—Leydig, Voit, Osann, Mayer & Holt, Ltd

[57] ABSTRACT

The armature of an electromagnetic clutch is connected to an axially fixed elastomeric ring by leaf springs which urge the armature away from the electromagnet. Rivets connect the springs to the armature and are formed with pin-like extensions which are telescoped snugly but slidably into holes in the ring. When the magnet is initially excited, the ring frictionally retards movement of the pin-like extensions to cause the armature to softly and quietly engage the magnet rather than slapping sharply against the magnet.

6 Claims, 3 Drawing Figures

U.S. Patent
Feb. 12, 1980
4,187,939
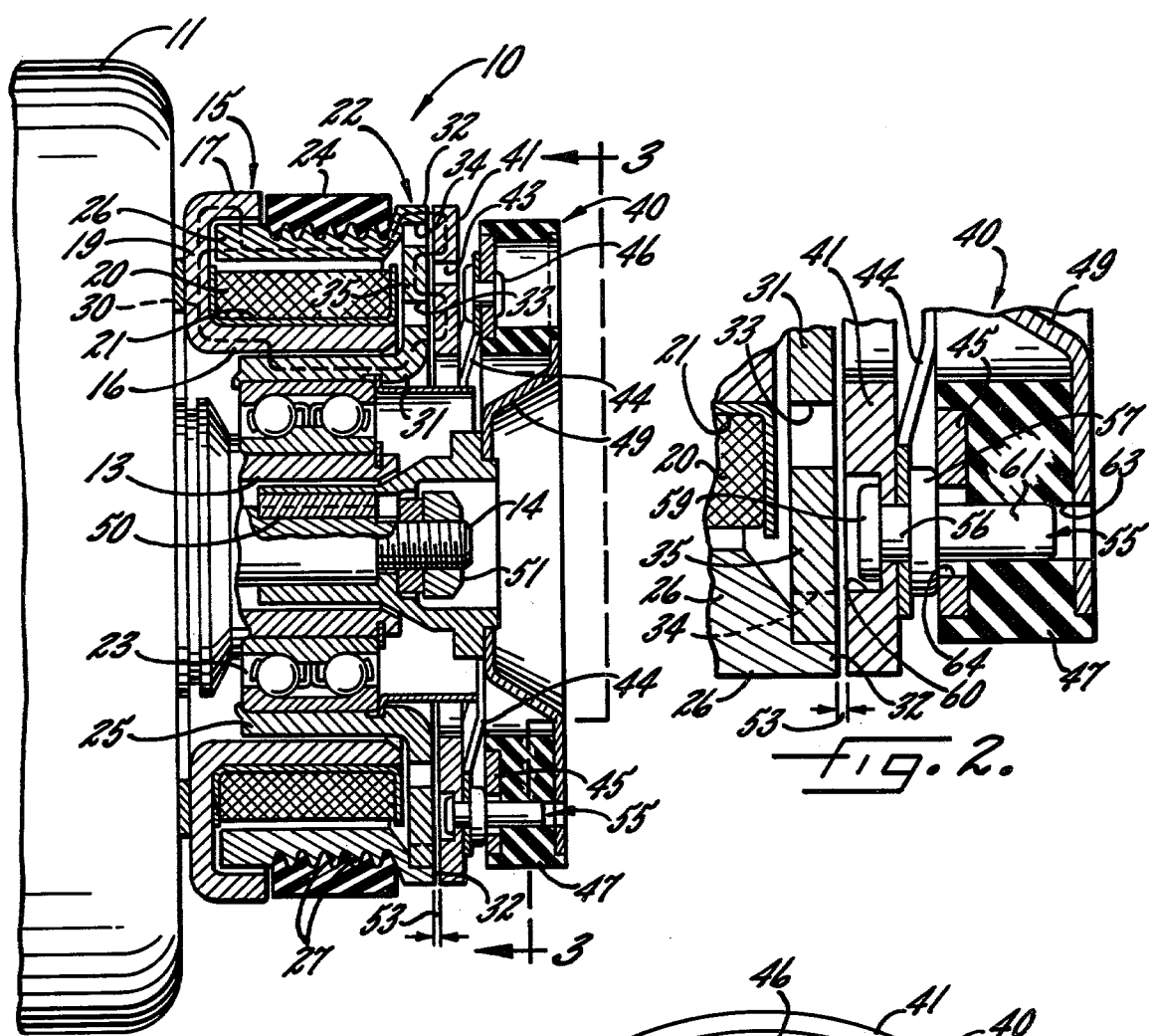
Fig. 1.
Fig. 2.
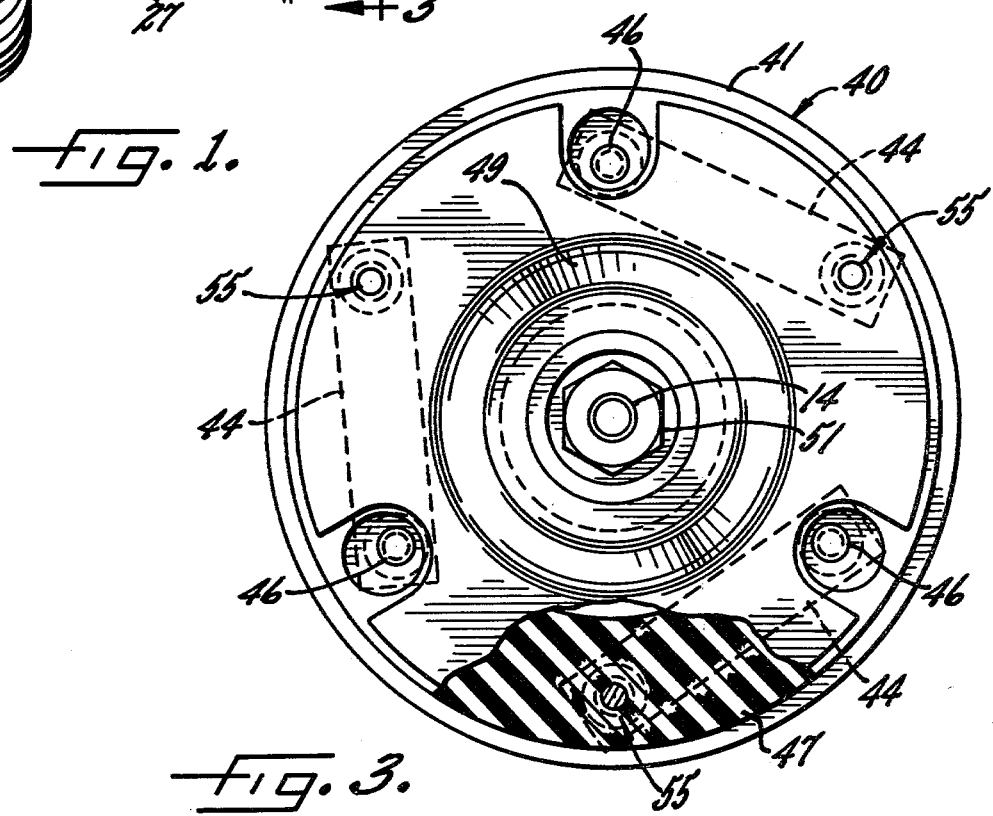
Fig. 3.

ARMATURE ASSEMBLY FOR ELECTROMAGNETIC COUPLING

BACKGROUND OF THE INVENTION

This invention relates to an electromagnetic coupling such as an electromagnetic clutch of the type having an electromagnet and a relatively rotatable armature assembly. More particularly, the invention relates to a coupling of the type in which the armature assembly is formed by an axially fixed ring, preferably made of elastomeric material, and by an armature which is connected to the ring by a series of angularly spaced leaf springs. The springs couple the armature and the ring for rotation in unison and enable the armature to shift axially into engagement with the magnet when the latter is excited. When the magnet is de-excited, the springs shift the armature out of engagement with the magnet.

A coupling of this general type is disclosed in Mantey U.S. Pat. No. 3,205,989. In that coupling, the ring of the armature assembly is made of elastomeric material in order to absorb torsional shock and vibration.

SUMMARY OF THE INVENTION

The general aim of the present invention is to provide an electromagnetic coupling of the foregoing character having a new and improved armature assembly which is uniquely constructed so as to reduce the noise which is created when the armature is initially drawn into engagement with the magnet.

A more detailed object is to use the ring to retard axial movement of the armature toward the magnet when the magnet is initially excited and thereby reduce the slapping force of the armature against the magnet.

The invention also resides in the utilization of the elastomeric properties of the ring to apply a frictional retarding force to fasteners which connect the leaf springs to the armature and which telescope tightly but slidably into the ring.

These and other objects and advantages of the invention will become more apparent from the following detailed description when taken in conjunction with the accompanying drawings.

BRIEF DESCRIPTION OF THE DRAWINGS

FIG. 1 is a diametrical sectional view of a new and improved electromagnetic coupling incorporating the unique features of the present invention.

FIG. 2 is an enlarged view of parts shown in FIG. 1.

FIG. 3 is a view taken substantially along the line 3—3 of FIG. 1.

DETAILED DESCRIPTION OF THE PREFERRED EMBODIMENT

As shown in the drawings for purposes of illustration, the invention is embodied in an electromagnetic coupling 10 which herein is in the form of an electromagnetic clutch. The clutch 10 is shown as being used in conjunction with an automobile air conditioning compressor 11 having a tubular nose 13 for mounting the clutch and having a drive shaft 14 which extends through the nose.

The clutch 10 includes an electromagnet which is formed in part by an annular magnet core 15 of substantially J-shaped radial cross-section and having an inner pole ring 16 and an outer pole ring 17. Formed integrally with and extending radially between the rear ends of the two pole rings is a bridge 19 which is rigidly secured to the end of the compressor 11. A multiple turn winding 20 is secured within a U-shaped channel 21 which, in turn, is fastened to the outer side of the inner pole ring 16. Reference may be made to Newton et al copending application Ser. No. 860,582, filed Dec. 14, 1977, entitled ELECTROMAGNETIC COUPLING and assigned to the same assignee as the present invention for a more detailed disclosure of the magnet core 15.

An annular rotor 22 is rotatably journaled on the nose 13 of the compressor 11 by a bearing 23 and is adapted to be driven from the engine of the vehicle by an endless belt 24. The rotor is substantially U-shaped in radial cross-section and includes inner and outer concentric annular pole pieces 25 and 26 made of magnetic material, the inner pole piece being secured to the outer race of the bearing. Several axially spaced grooves 27 extend circumferentially around the outer side of the outer pole piece 26 and interfit with complemental ribs on the inner side of the drive belt. Accordingly, the outer pole piece defines a pulley for the belt.

The inner pole piece 25 of the rotor 22 is spaced inwardly from the inner pole ring 16 of the magnet core 15 while the outer pole piece 26 of the rotor is located between and is spaced from the winding 20 and the outer pole ring 17 of the core. When the winding 20 is excited by a voltage source, magnetic flux is produced and threads through the core and the rotor and across the various gaps between the pole rings and the pole pieces. The flux path is indicated by the dotted line 30 shown in FIG. 1 and the nature of the controlled flux transfer between the core and the rotor is explained in more detail in the aforementioned application.

Pole faces 31 and 32 are defined by the forward ends of the rings 25 and 26, respectively. The pole faces are magnetically isolated from one another by radially spaced sets 33 and 34 of angularly spaced arcuate slots but are physically connected by an intervening ring 35 located between the two sets of slots.

Located in opposing relation to the pole faces 31 and 32 is an armature assembly 40. Herein, the armature assembly includes an armature 41 in the form of a circular disc made of magnetic material and having a series of angularly spaced and arcuate slots 43 located between its inner and outer sides. Three leaf springs 44 are spaced angularly around and extend generally chordwise of the armature. One end of each spring is connected to the armature while the other end of each spring is connected to an annular metallic bumper plate 45 by a conventional rivet 46. The bumper plate is bonded to the rear side of an annular member or ring 47 of rubber or other elastomeric material. Bonded to the forward side of the elastomeric ring is a hub assembly 49 which is keyed to the shaft 14 at 50, the hub assembly being held in an axially fixed position on the shaft by a nut 51.

The springs 44 couple the armature 41 for rotation in unison with the bumper plate 45, the ring 47 and the hub assembly 49 and urge the armature away from the pole faces 31 and 32 of the magnet rotor 22. When the winding 20 is not excited, a narrow axial air gap 53 (FIG. 2) exists between the armature and the poles faces. Upon excitation of the winding, the flux threading along the path 30 cuts across the gap 53 to draw the armature 41 into frictional engagement with the pole faces 31 and 32 and thereby couple the armature and the rotor for rotation in unison. The shaft 14 thus is rotated by way of the leaf springs 44, the bumper plate 45, the elastomeric ring 47 and the hub assembly 49. The purpose of the elastomeric ring is to absorb torsional shock when the armature 41 initially engages the pole faces 31 and 32 and to dampen torsional vibration during rotation of the shaft 14.

In accordance with the present invention, the ring 47 also is used to apply an axial retarding force to the armature 41 in order to reduce the noise which is created when the armature is initially drawn into contact with the pole faces 31 and 32. As a result of the retarding force, the armature engages the pole faces with a soft and relatively quiet action rather than slapping against the pole faces with a sharp click.

Preferably, the axial retarding force is applied to the armature 41 by way of special rivets 55 (FIG. 2) which are used to connect the leaf springs 44 to the armature. As shown in FIG. 2, each rivet includes a shank 56 which extends through holes in the armature and the end portion of the respective spring. Each spring is clamped rigidly to the armature by means of a shoulder 57 and a head 59 formed integrally with opposite ends of the shank, the shoulder engaging the spring. The head 59 engages the armature and is located in a recess 60 in the rear face of the armature.

In carrying out the invention, an axially projecting extension or pin 61 is formed integrally with the shoulder 57 of each rivet 55 and is telescoped snugly but slidably in a hole 63 formed in the elastomeric ring 47. There are three holes 63 spaced angularly around the ring and each is alined with a hole 64 in the bumper plate 45. The holes in the bumper plate receive the pins 61 with radial clearance but are smaller in diameter than the shoulders 57 so as to limit forward movement of the armature 41.

Because of the snug fit between the pins 61 and the holes 63, the pins are resiliently gripped by the ring 47. Thus, the ring frictionally retards movement of the pins when the winding 20 is excited to draw the armature 41 into engagement with the pole faces 31 and 32. As a result, the armature also is retarded and thus moves into soft and relatively silent engagement with the pole faces instead of slapping sharply against the pole faces. Accordingly, engagement of the clutch 10 is effected in a quieter manner.

We claim:

1. An electromagnetic coupling comprising an annular electromagnet and a relatively rotatable armature, said armature being drawn axially into engagement with said magnet when the latter is excited, resilient means acting on said armature and biasing said armature toward a position in which the armature is spaced from the magnet, and elastomeric means fixed axially relative to said magnet for frictionally retarding movement of said armature to reduce the force with which the armature strikes said magnet when the latter is excited, said elastomeric means frictionally retarding movement of said armature each time said armature is drawn into engagement with said magnet.

2. An electromagnetic coupling comprising an annular electromagnet and a relatively rotatable armature assembly, said armature assembly comprising a member axially spaced from and axially fixed relative to said magnet and further comprising an armature disposed between said member and said magnet, said armature being drawn axially into engagement with said magnet when the latter is excited, a series of leaf springs spaced angularly around said member and said armature, said springs coupling said armature and said member for rotation in unison and biasing said armature away from said magnet, one end portion of each of said springs being connected to said member, a fastener connecting the opposite end portion of each spring to said armature, and means extending axially from said opposite end portion of each spring and telescoped into said member with a slidable frictional fit to retard movement of said armature toward said magnet each time the latter is excited.

3. An electromagnetic coupling as defined in claim 2 in which said means comprises an extension formed integrally with each of said fasteners, and angularly spaced holes formed in said member and receiving said extensions with a snug but slidable fit.

4. An electromagnetic coupling as defined in claim 3 in which said member is an elastomeric ring, the walls of said holes resiliently gripping said extensions.

5. An electromagnetic coupling comprising an annular electromagnet and a relatively rotatable armature assembly, said armature assembly comprising a ring of elastomeric material spaced axially from and fixed axially relative to said magnet and further comprising an annular armature disposed between said ring and said magnet, said armature being drawn axially into engagement with said magnet when the latter is excited, a series of leaf springs spaced angularly around and extending generally chordwise of said ring and said armature, said springs coupling said armature and said ring for rotation in unison and biasing said armature away from said magnet, one end portion of each of said springs being connected securely to said ring, a fastener connecting the opposite end portion of each spring securely to said armature, angularly spaced holes formed in said ring, and extensions projecting axially from said fasteners and telescoped into said holes with a tight but slidable fit to retard movement of said armature toward said magnet each time the latter is excited.

6. An electromagnetic coupling as defined in claim 5 in which each of said fasteners comprises a rivet having a head and an axially spaced shoulder, said armature and said springs being sandwiched between the heads and the shoulders of said rivets, the diameter of said shoulders being greater than the diameter of said holes, said extensions comprising pins formed integrally with and projecting axially from said shoulders.

* * * * *